United States Patent [19]

Channell et al.

[11] 4,001,136
[45] Jan. 4, 1977

[54] FLUORINE GENERATING FORMULATION FOR USE IN CHEMICAL LASERS

[75] Inventors: Ronald E. Channell; John E. O'Pray, both of Edwards; Francisco Q. Roberto, Lancaster, all of Calif.

[73] Assignee: The United States of America as represented by the Secretary of the Air Force, Washington, D.C.

[22] Filed: July 1, 1975

[21] Appl. No.: 592,298

Related U.S. Application Data

[63] Continuation-in-part of Ser. No. 537,491, Dec. 30, 1974, abandoned.

[52] U.S. Cl. .................... 252/187 R; 149/109.2; 149/19.3; 149/119; 252/188.3 R; 280/741
[51] Int. Cl.² ............................................ C06D 5/06
[58] Field of Search ............... 252/187 R, 188.3 R; 149/19.3, 109.2, 122, 20; 423/464, 490, 504; 280/741

[56] References Cited

UNITED STATES PATENTS

| | | | |
|---|---|---|---|
| 3,708,570 | 1/1973 | Tolberg et al. | 423/464 |
| 3,876,477 | 4/1975 | Eldridge et al. | 149/19.3 |

Primary Examiner—Benjamin R. Padgett
Assistant Examiner—Irwin Gluck
Attorney, Agent, or Firm—Joseph E. Rusz; William J. O'Brien

[57] ABSTRACT

A solid propellant, gas generating formulation for use in providing gaseous reactants to a chemical laser. The formulation comprises a compressed powdered mixture of perfluoroammonium salts of the fluorinated Lewis acids, a metal nitride, and an alkali metal fluoride.

3 Claims, No Drawings

FLUORINE GENERATING FORMULATION FOR USE IN CHEMICAL LASERS

STATEMENT OF GOVERNMENT INTEREST

The invention described herein may be manufactured and used by or for the Government for governmental purposes without the payment of any royalty thereon.

BACKGROUND OF THE INVENTION

This application is a continuation-in-part of Ser. No. 537,491, filed on Dec. 30, 1974, now abandoned.

This invention relates to chemical lasers and to solid propellant gas generators for use therewith. In a more particular manner, this invention concerns itself with a fluorine gas generating solid composition for use in supplying high purity reactant gases to a chemical laser.

Laser systems that utilize a gaseous medium for creating lasing action are well known. For example, a number of gases such as carbon dioxide, nitrous oxide, helium and mixtures thereof are capable of achieving a lasing action. The necessary population inversion of these gases is accomplished by an electronic discharge. Other systems which utilize a gas, such as fluorine, accomplish their lasing action through the medium of a chemical reaction. In general, the chemically motivated technique involves the step of diffusing a first reactant gas, such as hydrogen or deuterium into a supersonic jet flow containing a second reactant gas, such a fluorine. The two gases react chemically to provide a sustained high speed flow of a vibrationally excited gaseous product with the requisite population inversion and lifetime needed to create a lasing action. The vibrationally excited gaseous product is allowed to flow into an optical laser cavity where the lasing action actually takes place.

The chemically motivated laser systems have been found to be very useful, especially for potential applications of chemical lasers to airborne military systems. However, considerable difficulty has been encountered in supplying these systems with the necessary fluorine reactant. Heretofore, the fluorine has been supplied from a liquid medium such as the well known liquid nitrogen trifluoride systems. The storage and maintenance problems, as well as the complex piping and valving arrangements, associated with the use of fluorine containing liquids created additional burdens that reduce the potential effectiveness of airborne chemical lasers.

With the present invention, however, it has been found that the problems associated with fluorine containing liquids have been overcome by the development of a solid propellant gas generating composition. The solid propellant gas generators of this invention have demonstrated the capability of supplying high purity reactant gases to chemical lasers. For potential military systems applications of chemical lasers, the inherent storability, simplicity, and compactness of solid propellant gas generators are highly attractive.

SUMMARY OF THE INVENTION

In accordance with this invention, it has been found that the gaseous reactants required to generate lasing action through the medium of a chemical reaction can be supplied from a solid propellant gas generating material having a particular compositional content. In order to produce the high purity gas required for a chemical laser, it was necessary to develop an unconventional pressed inorganic propellant grain which, when ignited, produces nitrogen trifluoride plus fluorine as the primary products during self-sustaining combustion. The formulation consists of a powdered alkali metal fluoride, a metal nitride, and a perfluoroammonium salt of a Lewis acid, which are intimately mixed and then pressed into a cohesive solid composition. The combustion products of this formulation are nitrogen trifluoride, fluorine and nitrogen or only nitrogen trifluoride and fluorine. These products compositions can be readily controlled by adjusting the percentage of metal nitride consumed and, thereby, adjusting the amount of fluorine burned in the reaction. The novel feature of this invention is the combination of an alkali metal fluoride, a metal nitride, and a perfluoroammonium salt of a Lewis acid in a composition of matter which will sustain combustion and yield cool nitrogen trifluoride and molecular fluorine as the primary products. The invention provides for a stable, storable, and simple source of nitrogen trifluoride for use in airborne chemical laser systems which employ precombustion of nitrogen trifluoride for the production of fluorine atoms for use in the hydrogen fluoride or deuterium fluoride chemical laser. This invention eliminates the complexities associated with maintaining and manipulating liquid nitrogen trifluoride systems.

Accordingly, the primary object of this invention is to provide a solid composition capable of supplying gaseous reactants to a chemical laser.

Another object of this invention is to provide a solid formulation which produces nitrogen trifluoride and fluorine when ignited.

Still another object of this invention is to provide a fluorine gas generating solid composition for use in chemical lasers.

A further object of this invention is to provide a simple storable source of nitrogen trifluoride and molecular fluorine for use in airborne applications of chemical lasers.

The above and still further objects and advantages of the present invention will become more readily apparent upon consideration of the following detailed description of the preferred embodiments thereof.

DESCRIPTION OF THE PREFERRED EMBODIMENTS

Pursuant to the above objects of this invention, the present invention involves the formulation of a solid propellant fluorine gas generating composition for use in chemical lasers. The compositions of this invention are composed of a mixture of from about 53 to 92 weight percent of a perfluoroammonium salt of a Lewis acid selected from the group consisting of perfluoroammonium hexafluoroantimonate, perfluoroammonium hexafluoroarsenate and perfluoroammonium tetrafluoroborate; about 0.5 to 2 weight percent of a metal nitride selected from the group consisting of aluminum, magnesium and lithium nitrides; and about 7 to 46 weight percent of an alkali metal fluoride selected from the group consisting of lithium, sodium, potassium, rubidium and cesium fluorides.

The preparation of the nitrogen trifluoride and fluorine generator formulation of this invention is very straightforward. The crystalline ingredients are first ground separately to a fine powder in a dry nitrogen atmosphere. All of the formulations presented in this disclosure are very reactive with moisture, and thus must be handled in a moisture-free atmosphere at all times. Therefore, all formulation preparations are conducted in a nitrogen atmosphere dry box equipped with a drying train and operating at a very low moisture level (typically a minus 100° centigrade frost point). The typical dry box nitrogen atmosphere conditions are a pressure of 13.3 psia, and a temperature of 15° to 20° centigrade. All formulation ingredients are seived separately to a particle size of less than 90 mesh. The quantity of each ingredient for the selected formulation is then weighed out separately. All of the ingredients are placed in an appropriate size teflon beaker in preparation for mixing. The ingredients are thoroughly mixed in the teflon beaker by stirring with a teflon coated spatula. Approximately 15 minutes mixing time is required. The thoroughly mixed formulation is pressed into a cohesive solid grain in a ⅝ inch diameter by ⅝ inch deep cylindrical nickel sample container employing a packing pressure of 1800 psi delivered by a standard mechanical press. Ignition of the sample is readily achieved using a Nichrome hotwire technique in which an electrical current of sufficient magnitude to heat the Nichrome wire to the ignition temperature of the sample is passed through the wire which is in physical contact with the sample surface.

The theoretical behavior of the nitrogen trifluoride gas generator is also straightforward. The general empirical reaction is as follows:

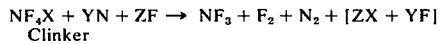

$$NF_4X + YN + ZF \rightarrow NF_3 + F_2 + N_2 + [ZX + YF] \text{ Clinker} \quad (1)$$

Wherein

X represents $SbF_6$, $BF_4$, $AsF_6$ or $BiF_6$;
Y represents Al, Mg or Li; and
Z represents Li, Na, K, Rb, or Cs.

The alkali metal fluoride serves the function of trapping the fluorinated Lewis acid and, thus, retaining it as part of the residual intact "clinker" resulting in a combustion gas composition free of heavy metal fluorides. The combustion gas temperature and composition can be varied by adjusting the type and quantity of metal nitride consumed in the active reaction of the metal nitride with fluorine to produce the metal fluoride plus nitrogen. For example, lithium nitride is more reactive than aluminum nitride and, thus, produces a warmer gas temperature. The quantity of fluorine can be varied from a theoretical minimum $F_2/NF_3$ mole ratio of zero to a maximum mole ratio of 1/1 by decreasing the $ZN/NF_4X$ mole ratio from ⅓ to zero.

The combustion product composition was experimentally determined for the gas generating formulation consisting of 66.3 weight percent perfluoroammonium hexafluoroantimonate salt ($NF_4SbF_6 \cdot 0.6\ SbF_5$), 33.1 weight percent cesium fluoride, and 0.6 weight percent aluminum nitride. This analysis was conducted using a molecular beam time-of-flight mass spectrometer which is capable of directly sampling the combustion products from a sample burning at atmospheric pressure. A helium purge around the combustion sample eliminated atmospheric contamination. The experimental results are given below:

| mole percent - gases | Experimental | Theoretical |
| --- | --- | --- |
| $NF_3$ | 71.0 | 52.6 |
| $F_2$ | 14.0 | 44.7 |
| $N_2$ | 10.0 | 2.6 |
| HF | 3.0 | |

| mole percent - gases | Experimental | Theoretical |
| --- | --- | --- |
| NO | 1.0 | |

The observation of hydrogen fluoride and losses of fluorine were attributed to the passivation of the hardware by fluorine. The presence of NO was attributed to known NO contamination of the perfluoroammonium hexafluoroantimonate.

In addition to the combustion product composition tests, the formulation of this invention was also tested to include ingredient compatibility tests of mixtures of powdered potassium fluoride, lithium nitride, and perfluoroammonium hexafluoroantimonate. Small samples of the pressed powder mixtures were ignited with a Nichrome wire heated by an electrical current resulting in a steady, stable combustion of the samples.

Additional tests were conducted to show that nitrogen trifluoride is an excellent DF chemical laser oxidizer.

Using nitrogen trifluoride oxidizer supplied from a compressed gas cylinder, over one hundred low power lasing tests in the deuterium fluoride (DF) direct chemical lasing mode were conducted. The supersonic flow cavity mixing nozzle array used for the lasing demonstrations is typical of the high performance laser nozzle designs currently utilized. The individual nozzles are two-dimensional converging-diverging "wedge" nozzles. Large nozzles flowing a hot stream of dissociated fluorine plus diluent gases and precombustor products alternate with small nozzles flowing deuterium fuel. In the small nozzle array used for the lasing tests, there are two fluorine nozzles and three deuterium nozzles. The copper nozzles are water cooled. The nozzle length (parallel to the throat slit) is one inch. The two fluorine nozzles have an average throat height of 0.0058 inches and an average geometric expansion ratio of 13.8 with a 12° half angle. The three deuterium nozzles have an average throat height of 0.0039 inches, an average geometric expansion ratio of 11.4, and a 15° half angle.

The low power DF laser utilizes a conventional, stable optical resonator. The mirrors are mounted externally with the beam passing into the low pressure laser cavity region through Barium Fluoride windows inclined at Brewster's angle. The optical cavity length is 72 centimeters with a 98 percent reflective, one inch diameter, gold coated mirror of 3.0 meter radius of curvature at one end and a 93 percent reflective germanium output coupler 2.0 inches in diameter with 4.0 meter radius of curvature at the other end of the optical cavity. Laser Power is measured by a Coherent Radiation Model 201 Broadband Laser Power Meter Mounted directly behind the output coupler. The centerline of the optical cavity was located 0.125 inch downstream of the nozzle exit plane for a typical test using nitrogen trifluoride oxidizer.

For these lasing tests to verify that nitrogen trifluoride is a suitable oxidizer for chemical lasers, the laser reactants were supplied from commercial compressed gas cylinders. All gases were of greater than 99 percent purity. The nitrogen trifluoride oxidizer and hydrogen fuel were injected into the precombustor through an impinging triplet injector. The Argon diluent was injected into the precombustor through a separate array of orifices. The deuterium cavity fuel was supplied to the three deuterium nozzles through a manifold. The gas flow rates in units of liters per minute (S.T.P.) were: 4.136$NF_3$, 4.539$H_2$, 1.612$CF_4$, 9.401Ar, 92$D_2$. For this typical lasing test using nitrogen trifluoride, at the middle of the four second test the laser power was 0.52 Watts, the precombustor pressure was 8.65 psia, the deuterium nozzle stagnation pressure was 5.7 psia, and the laser cavity pressure was 3.6 Torr. This extensive series of successful lasing tests with bottled gaseous nitrogen trifluoride oxidizer verifies that the solid formulations which generate nitrogen trifluoride could also be used to supply the laser oxidizer.

The present invention provides a solid composition that can be used as a single, storable source of cool nitrogen trifluoride and molecular fluorine. It eliminates the conplexities associated with maintaining and manipulating a liquid nitrogen trifluoride system. It has been found to be especially useful for laser systems which employ nitrogen trifluoride in the precombustor for supplying the fluorine atoms used in the hydrogen fluoride or deuterium fluoride chemical laser.

While there have been described herein what are considered to be preferred embodiments of the invention, it will be obvious to those skilled in the art that modifications and alterations may be made without departing from the essence of the invention. It is to be understood, therefore, that the exemplary embodiments are illustrative only and are not to be considered as restrictive of the invention, the scope of which is defined by the appended claims.

What is claimed is:

1. A solid gas generating composition comprising a compressed mixture of (a) about 53 to 92 weight percent of a perfluoroammonium salt of a fluorinated Lewis acid selected from the group consisting of perfluoroammonium tetrafluoroborate, perfluoroammonium hexa fluoroarsenate, and perfluoroammonium hexafluoroantimonate; (b) about 0.5 to 2 weight percent of a metal nitride selected from the group consisting of aluminum nitride, magnesium nitride, and lithium nitride; and (c) about 7 to 46 weight percent of an alkali metal fluoride selected from the group consisting of lithium fluoride, sodium fluoride, potassium fluoride, rubidium fluoride, and cesium fluoride.

2. A composition in accordance with claim 1 wherein said mixture is composed of about 53 to 92 weight percent perfluoroammonium hexafluoroantimonate; about 0.5 to 2 weight percent aluminum nitride; and about 7 to 46 weight percent cesium fluoride.

3. A composition in accordance with claim 1 wherein said mixture is composed of about 66.3 weight percent perfluoroammonium hexafluoroantimonate; about 33.1 weight percent cesium fluoride; and about 0.6 weight percent aluminum nitride.

* * * * *